Jan. 4, 1927.
C. MOTT
1,613,405
PROCESS OF PRODUCING OXYGEN AND AMMONIA
Original Filed August 18, 1922
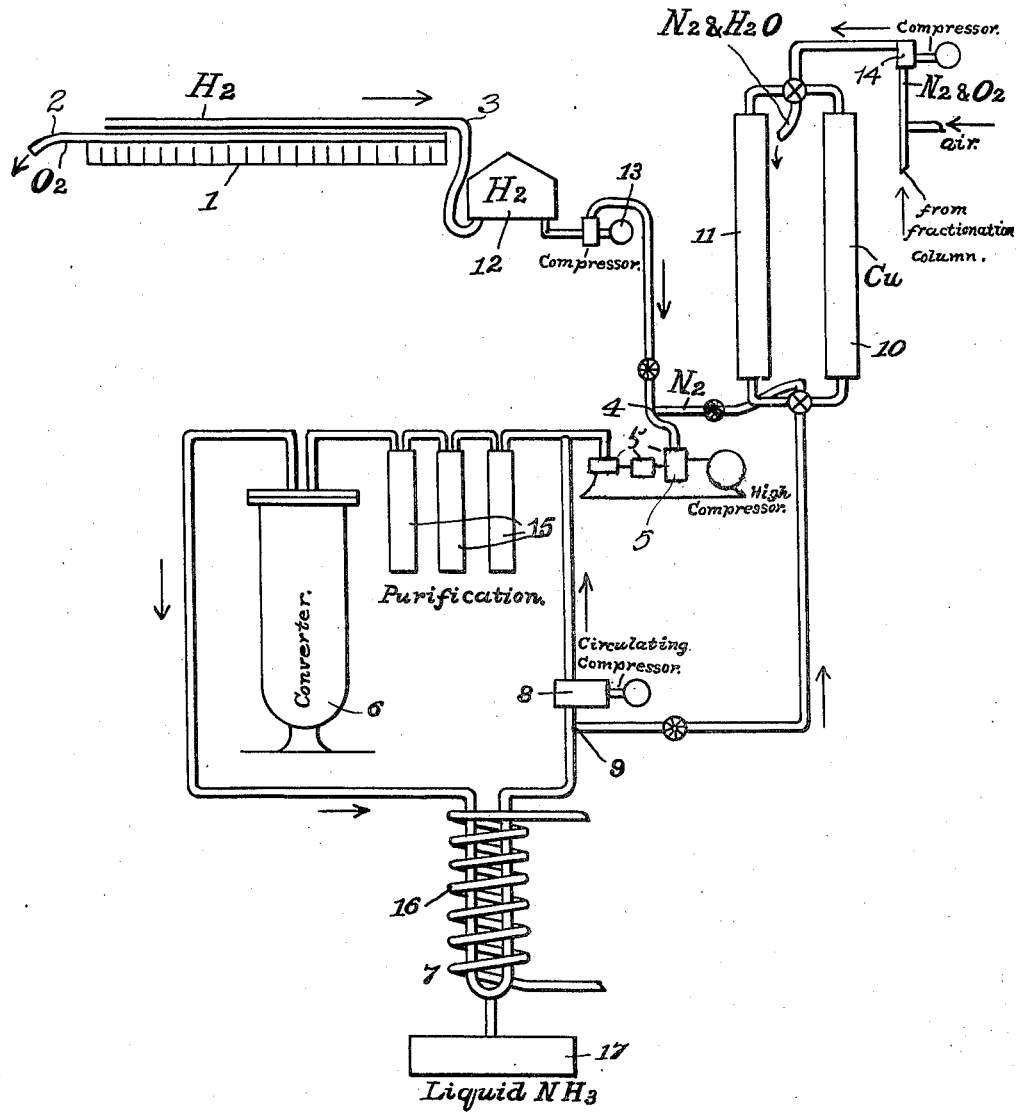
Inventor
Chester Mott.

Patented Jan. 4, 1927.

1,613,405

UNITED STATES PATENT OFFICE.

CHESTER MOTT, OF DENVER, COLORADO, ASSIGNOR TO COMPRESSED GAS CORPORATION, OF DENVER, COLORADO, A CORPORATION OF DELAWARE.

PROCESS OF PRODUCING OXYGEN AND AMMONIA.

Application filed August 18, 1922, Serial No. 582,700. Renewed November 20, 1926.

My invention relates to the production of ammonia by the synthetic process, and more particularly to such production in connection with the production of commercial oxygen.

The purpose of my invention is to combine the production of oxygen and ammonia in such a way as to practically eliminate waste.

More particularly, one object is to utilize hydrogen or nitrogen, or both, that are secured as by-products in the manufacture of commercial oxygen to supply the materials for the production of ammonia.

Another object is to utilize the hydrogen in the gases purged from the ammonia producing circuit as a reducing agent for materials capable of being subsequently oxidized and so separating oxygen from nitrogen with which it is mixed, thereby purifying nitrogen for the production of ammonia.

How these and other objects are attained will appear as the description proceeds, and will be pointed out in the appended claims.

The preferred form of my process is as follows, reference being had to the accompanying drawing showing the various steps diagrammatically.

The first step is the electrolytic production of oxygen and hydrogen from water, as at 1. The oxygen is taken off, as at 2, and used for various commercial purposes. Ordinarily there is little market for the hydrogen which results incidentally from such production of oxygen.

In order to utilize this hydrogen, it is taken off, as at 3, and mixed in substantially the ratio of three to one with nitrogen, as at 4, compressed, as at 5, and passed through a suitable catalyst bomb, as at 6. Ammonia formed by the combination of hydrogen and nitrogen in the bomb is extracted, as at 7, and the residue of the uncombined hydrogen and nitrogyn re-compressed, as at 8, and returned to the circuit to be once more passed over the catalyst.

Ordinarily the nitrogen used is not pure, but is mixed with inert gases, such as argon. If hydrogen and such impure nitrogen are continuously added to the circuit and there is nothing taken out except the ammonia, these inert gases will gradually accumulate until they seriously impede the process.

To avoid this a small portion of the gases may be exhausted or purged, as at 9, and in this way the indefinite increase of the inert gases prevented.

One of the purposes of my invention is to utilize the hydrogen in this purged gas.

The nitrogen is available usually mixed with oxygen whichever source of nitrogen is used, as will be explained later. In order to free the nitrogen from the oxygen the mixture is passed over an oxidizable material such as a metallic copper heated to such a temperature that oxidation will take place. In the diagram two receptacles, 10 and 11, are indicated for containing such oxidizable material. After the mixture of nitrogen and oxygen has been passed through one of these receptacles, as 10, the purified nitrogen is passed to the point where it is mixed with the hydrogen, as at 4. When the material in receptacle 10 becomes mostly oxidized the valves are turned to pass the mixture of nitrogen and oxygen through receptacle 11. While this is being done the purged gases referred to above are passed through the receptacle 10 and the hydrogen in such gases reduces the copper oxid to metallic copper so that it may be used again for purifying nitrogen.

The mixture of nitrogen and oxygen introduced into the oxidizing receptacle may be air. Where this is the case substantially one-sixth of the hydrogen is needed to secure enough nitrogen to mix with the remaining hydrogen in the proper proportion to form ammonia. If enough of the mixed gases is purged to provide this hydrogen a state of equilibrium will be reached in the ammonia circuit when the inert gases reach a concentration about six times that in the mixture introduced and this amount does not seriously affect the reactions.

I prefer to use the nitrogen secured from fractional distillation of liquid air. I carry out this fractional distillation for the purpose of obtaining commercially pure oxygen; and when this is done a small percentage of oxygen remains in the nitrogen. It therefore follows that when I use nitrogen from this source a smaller percentage of the gases need to be purged from the ammonia circuit to provide sufficient hydrogen for reducing the oxid produced in the purification of the nitrogen. But it is also true that in the distillation of the liquid air to obtain oxygen a portion of the inert gases remain with the oxygen so that the percentage of inert gases in nitrogen from this source is less than the percentage of such inert gases to the nitrogen in the air; therefore it requires less purging to keep the percentage of inert gases small enough to avoid injurious effects.

It is, of course, possible to use a portion of the hydrogen obtained in the electrolytic process directly for the reduction of the oxid for the purification of nitrogen without first passing such hydrogen through the ammonia producing circuit. But I prefer to use the hydrogen from the purged gases as in that way the excess of inert gases in the ammonia circuit is avoided and at the same time all of the hydrogen is efficiently utilized.

While the most favorable condition for the production of synthetic ammonia is to have the nitrogen and hydrogen present in the ammonia producing device in their combining proportions, that is, in the ratio of three of hydrogen to one of nitrogen, it has been found that this proportion can be departed from to a considerable degree without any great lessening in the amount of ammonia formed at each operation. For example, a ratio of four of hydrogen to one of nitrogen has given satisfactory results.

Besides the slight lessening in the percentage of ammonia produced during each circulation of the gases, the following considerations, amongst others, affect the advisability of a departure from the exact combining proportions in working my process. When the proportion of hydrogen is increased, the purged gases are richer in hydrogen, and so a less quantity is required in the nitrogen purifying process, and this less quantity carries a smaller percentage of nitrogen which is ultimately returned to the air with the purged inert gases and the water formed in the reducing process. It follows that a less percentage of the total hydrogen is used in purifying nitrogen, so that the process is more economical from the standpoint of utilization of all hydrogen and nitrogen produced; but, on the other hand, a less quantity of gases being purged, the inert gases will constitute a higher percentage of the gas in the circuit.

For example, if hydrogen be introduced in the proportion of three to one of hydrogen, and one-eighth of the gases introduced be purged, the ultimate proportion of the hydrogen to nitrogen in the circuit will be approximately four to one, and the proportion of inert gases in the circuit will be approximately eight times that in the mixture introduced. When ten percent of the nitrogen in the circuit is combined to form ammonia at each passage, equilibrium will be reached substantially in accordance with the table below:

| | |
|---|---|
| Mixture returned to circuit | 248H and 62N |
| Mixture added to circuit | 25H and 8N |
| Mixture passed through $NH_3$ former | 273H and 70N |
| Gases extracted as $NH_3$ | 21H and 7N |
| 4 to 1 mixture left | 252H and 63N |
| Gases purged | 4H and 1N |
| Mixture returned to the circuit | 248H and 62N |

Where nitrogen is obtained from the air, the reduction formula works out roughly 4H combined with 2O to form water, and the 2O removed from the air purifies substantially the 8N required.

The above proportions are cited by way of example, and are not to be considered as a limitation.

When the nitrogen is obtained by the distillation of liquid air, the hydrogen used in the purification process is less important, and if desired because of the nature of the catalyst used or for other reasons, the proportion of nitrogen may be increased, with a consequent increase in the proportion of gases purged and utilized in purifying nitrogen, and also a decrease in the inert gases present in the circuit.

As will be seen, the amount of gases purged with the efficient use of their hydrogen content is varied by varying the percentage of hydrogen and nitrogen in the circuit, and this fact is utilized to adjust the process to requirements of particular cases.

It is generally advisable to lead the hydrogen produced by the electrolytic process first to a storage tank, as 12, and partially compress the hydrogen, as at 13, before mixing with the nitrogen; and the mixture of nitrogen and oxygen, whether from the atmosphere or from the distillation of liquid air, is preferably given a preliminary compression, as at 14.

It is, of course, obvious that additional means for purifying the gases of any desirable and suitable type may be used at such points as found advisable, one such means being indicated at 15.

The extraction of ammonia is diagrammatically indicated as being by means of a cooling coil 16, liquid ammonia being drawn off into tank 17; but other means for extracting the ammonia may be used when desired.

It is also clear that in its broader aspects the invention is capable of utilization with various changes in the individual steps, such as the combination of the hydrogen and nitrogen to form ammonia by means of an electric spark instead of by passing over a catalyst.

Other practical features, such as heat interchangers at suitable points, not illustrated, it is not considered necessary to discuss further, as the above disclosure is believed sufficient to enable anyone skilled in the art to use the invention.

As will be seen, I have invented a process by which oxygen and ammonia may be produced efficiently and waste products eliminated.

I claim:

1. The process of producing ammonia which comprises passing a mixture of nitrogen, oxygen and inert gas over an oxidizable material to free the mixture from oxygen, mixing hydrogen with the nitrogen so purified, passing the mixture through a device adapted to cause a portion of the nitrogen and hydrogen to unite and form ammonia, removing the ammonia from the mixture, purging off a portion of the mixture freed from ammonia, to prevent indefinite increase of the inert gas in the circuit, returning to the ammonia forming device the rest of the mixture with the addition of a new supply to keep the quantity constant, and passing the purged portion of the mixture over material oxidized in the purification of the nitrogen to reduce the material for re-use.

2. The process of producing ammonia which comprises passing a mixture of nitrogen, oxygen and inert gas over an oxidizable material to free the mixture from oxygen, mixing hydrogen with the nitrogen so purified, passing the mixture over a catalyst to produce ammonia, removing the ammonia from the mixture, purging off a portion of the mixture freed from ammonia, to prevent indefinite increase of the inert gas in the circuit, returning to the catalyst the rest of the mixture with the addition of a new supply to keep the quantity constant, and passing the purged portion of the mixture over material oxidized in the purification of the nitrogen to reduce the material for re-use.

3. In the process set forth in claim 1, adjusting the quantity of gas purged from the circuit in accordance with the hydrogen in the purged gas utilizable in purifying nitrogen for introduction into the circuit.

4. In the process set forth in claim 2, adjusting the quantity of gas purged from the circuit in accordance with the hydrogen in the purged gas utilizable in purifying nitrogen for introduction into the circuit.

5. In the process set forth in claim 2, varying the proportion of hydrogen to nitrogen introduced into the circuit from three to one, and adjusting the quantity of gas purged from the circuit in accordance with the quantity of hydrogen in the purged gases utilizable in the purification of nitrogen for introduction into the circuit.

In testimony whereof I hereunto affix my signature.

CHESTER MOTT.